United States Patent
Rawe et al.

(10) Patent No.: US 7,617,391 B2
(45) Date of Patent: Nov. 10, 2009

(54) METHOD AND APPARATUS FOR DYNAMICALLY SELECTING ONE OF MULTIPLE FIRMWARE IMAGES FOR BOOTING AN I/O CONTROLLER

(75) Inventors: Lawrence James Rawe, Colorado Springs, CO (US); Roy Wayne Wade, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 298 days.

(21) Appl. No.: 11/305,180

(22) Filed: Dec. 15, 2005

(65) Prior Publication Data

US 2007/0143589 A1 Jun. 21, 2007

(51) Int. Cl.
*G06F 9/24* (2006.01)
*G06F 15/177* (2006.01)

(52) U.S. Cl. .............. 713/1; 713/2; 713/100; 709/203; 709/226; 709/232

(58) Field of Classification Search .......... 713/1, 713/2, 100; 709/203, 226, 232
See application file for complete search history.

(56) References Cited

U.S. PATENT DOCUMENTS

| | | | | |
|---|---|---|---|---|
| 6,381,693 B2 * | 4/2002 | Fish et al. | | 713/1 |
| 6,446,203 B1 * | 9/2002 | Aguilar et al. | | 713/2 |
| 6,971,002 B2 * | 11/2005 | Austen et al. | | 713/1 |
| 7,003,656 B2 * | 2/2006 | Chheda et al. | | 713/1 |
| 7,234,051 B2 * | 6/2007 | Munguia et al. | | 713/2 |
| 2004/0030883 A1 * | 2/2004 | Munguia et al. | | 713/100 |
| 2005/0060531 A1 * | 3/2005 | Davis et al. | | 713/2 |

* cited by examiner

*Primary Examiner*—Abdelmoniem Elamin
(74) *Attorney, Agent, or Firm*—Yee & Associates, P.C.

(57) ABSTRACT

A method and apparatus are disclosed in a data processing system for dynamically selecting one of multiple different I/O firmware images for booting a particular I/O controller that is included in the data processing system. Multiple different I/O firmware images are provided. A configuration of the I/O controller is determined. One of the I/O firmware images is identified that supports the configuration of the particular I/O controller. The identified I/O firmware image is then dynamically selected for booting said I/O controller.

16 Claims, 4 Drawing Sheets

METHOD AND APPARATUS FOR DYNAMICALLY SELECTING ONE OF MULTIPLE FIRMWARE IMAGES FOR BOOTING AN I/O CONTROLLER

BACKGROUND OF THE INVENTION

1. Technical Field

The present invention is directed generally towards data processing systems and in particular to a method and apparatus for dynamically selecting one of multiple different I/O firmware images for booting an I/O controller.

2. Description of the Related Art

Known computer systems include a system firmware image that is used to boot and control the computer system. During a boot process, the system BIOS downloads this image and causes it to begin executing. Once the system firmware image is executing, the system firmware image configures and boots the rest of the computer system.

An input/output (I/O) controller is typically included within a computer system and is used to monitor and control I/O operations of the I/O devices that are coupled to the computer system. Some I/O controllers are sophisticated enough that they are bootable devices that boot using their own dedicated I/O firmware image. For these devices, after the system firmware image has been downloaded and begins executing, the system BIOS copies a single file that includes both the I/O firmware image and an I/O boot services driver (BSD) to system memory. The I/O boot services driver is then responsible for booting the I/O controller by copying the single firmware image to the I/O controller.

One disadvantage of the prior art system is the limitation that only one I/O firmware image is provided. Different I/O controllers may have different configurations and, thus, different capabilities. The I/O firmware image that is used to boot and control an I/O controller should be configured to support the particular configuration and capabilities of the I/O controller on which it will run. Some computer systems may include multiple different I/O controllers that are configured differently and include different capabilities. For such a computer system, there is a need for multiple different I/O firmware images. The prior art, however, provides for only one I/O firmware image.

Another disadvantage of the prior art is the limitation that the I/O boot services driver and the firmware image are bundled together in a single file. Because the I/O firmware image is not stored separately, it is more difficult to update the I/O firmware image or I/O BSD at a later time. When an update needs to be made, both the BSD and the firmware image must be written regardless of whether or not only the BSD or only the firmware image needs to be updated. For example, even if only the I/O firmware image needs to be modified, the entire file that includes the I/O firmware image and BSD must be written, requiring writing a new BSD. Because both the BSD and firmware image must be accessed regardless of which one needs to be modified, there is an opportunity for inadvertently modifying either the BSD the firmware image.

FIG. 4 is a high level flow chart that depicts booting an I/O controller utilizing a single file that includes a boot services driver and a firmware image that is the only available firmware image to use to boot the controller in accordance with the prior art. The process starts as illustrated by block 400 and thereafter passes to block 402 which depicts starting the booting of the entire computer system. Next, block 404 illustrates downloading the system firmware image and beginning executing it which includes the execution of the system BIOS. The process then passes to block 406 which depicts the system BIOS copying the single file that includes both the I/O boot services driver (BSD) and the one firmware image from the one location where the file is stored in flash memory to a single location in system memory as one package. Block 408, then, illustrates the system BIOS causing the I/O BSD to start executing. Thereafter, block 410 depicts the I/O BSD starting the booting of the I/O controller.

Next, block 412 illustrates the I/O BSD, which is stored at the single location in system memory, downloading the firmware image from that location to the I/O controller. The I/O BSD is always aware of the location of the firmware image because both the I/O BSD and the firmware image are stored in the same file at the same location. Thus, there is no need for any mechanism or process by which the I/O BSD is made aware of the location of the firmware image.

The process then passes to block 414 which depicts the firmware image, which is the only firmware image that is available, beginning running on the I/O controller. Thereafter, block 416 illustrates completing the booting of the I/O controller. Block 418, then, depicts completing the booting of the entire computer system. The process then terminates as illustrated by block 420.

Therefore, a need exists for a method and apparatus for dynamically selecting one of multiple different firmware images and for downloading the selected I/O firmware image for booting an I/O controller.

SUMMARY OF THE INVENTION

A method and apparatus are disclosed in a data processing system for dynamically selecting one of multiple different I/O firmware images for booting a particular I/O controller that is included in the data processing system. Multiple different I/O firmware images are provided. A configuration of the I/O controller is determined. One of the I/O firmware images is identified that supports the configuration of the particular I/O controller. The identified I/O firmware image is then dynamically selected to use for booting said I/O controller.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
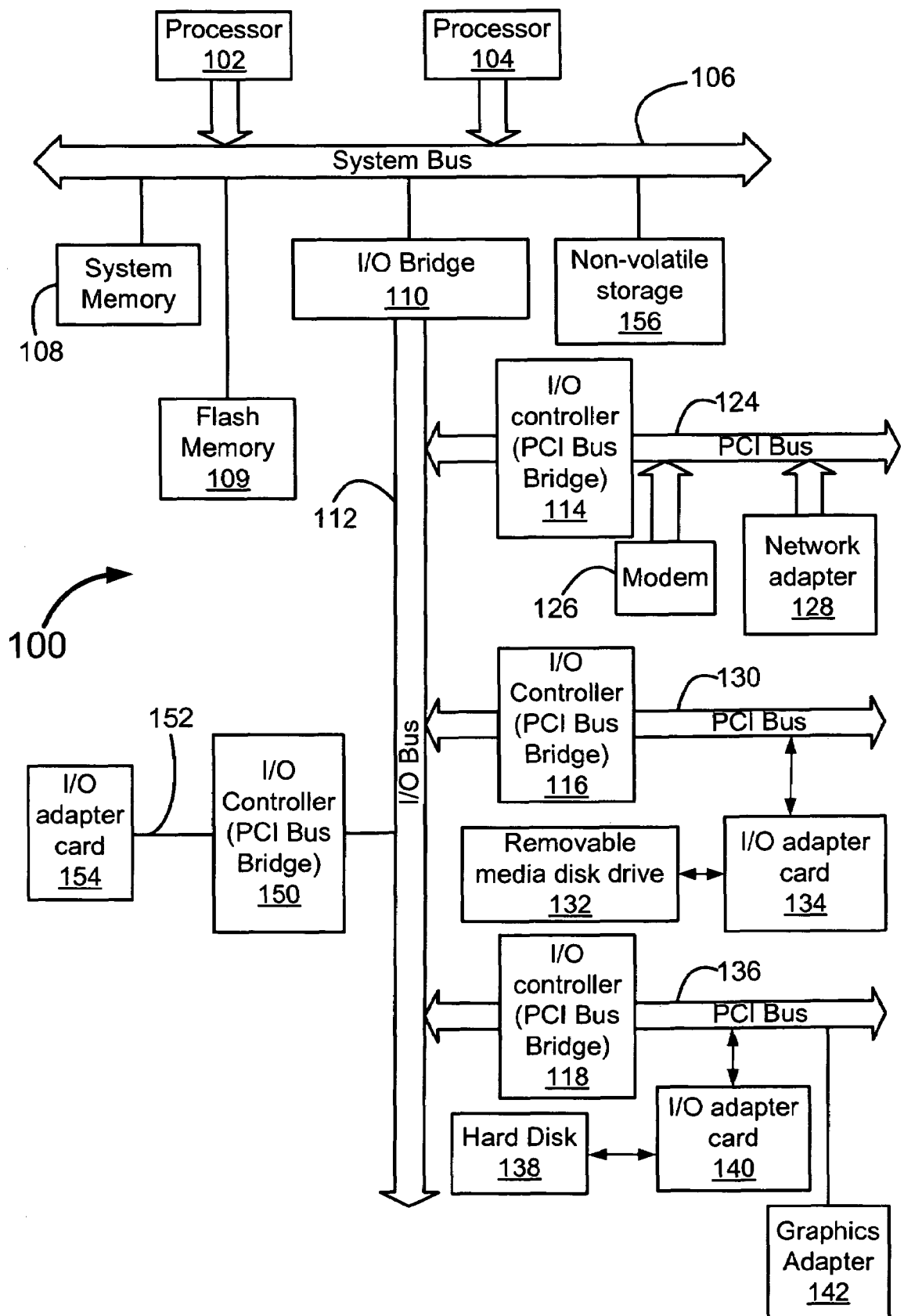
FIG. 1 is a block diagram of a computer system that includes multiple I/O controllers that can be booted utilizing an I/O firmware image that was selected from among multiple different available I/O firmware images in accordance with a preferred embodiment of the present invention.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention is a method and apparatus for dynamically selecting one of multiple different I/O firmware images and for downloading the selected I/O firmware image for booting an I/O controller. According to the present invention, multiple different I/O firmware images are provided. Each one of these I/O firmware images may support a different set of I/O controller configurations and capabilities. Each one of these I/O firmware images may be different versions of the same image or may be completely different I/O firmware images.

In the preferred embodiment, all of the different I/O firmware images are stored sequentially within a single file although those skilled in the art will recognize that each I/O firmware image may be stored in its own separate file. In addition, those skilled in the art will also recognize that the I/O firmware images can be stored in any binary image format, which includes being stored in a single or multiple files.

When a particular I/O controller is to be booted, the system BIOS copies the I/O boot services driver (BSD) to system memory and then starts the I/O BSD so that the I/O BSD can boot that I/O controller. The system BIOS also copies the file that includes all of the different I/O firmware images to a particular location in system memory. The system BIOS makes the particular location available to the I/O BSD so that that the I/O BSD knows where to locate the I/O firmware images.

The I/O BSD then determines the configuration and capabilities of the I/O controller that is to be booted. The I/O BSD selects the I/O firmware image that either supports or best supports this configuration and these capabilities. The I/O BSD downloads the selected I/O firmware image which begins to run on the I/O controller.

An I/O firmware image is selected by comparing the configuration and capabilities of the I/O controller to be booted to the configuration and capabilities supported by each I/O firmware image included within the file. These capabilities and configuration may be specified within registers in the I/O controller, for example, or may be specified within a particular file associated with the I/O controller. Similarly, the capabilities and configuration of an I/O firmware image may be specified as part of a header file within that I/O firmware image. The I/O firmware images in the file are parsed in order to select one of the images.

According to the preferred embodiment, the multiple I/O firmware images are stored in a single file. When the I/O BSD needs to select one of the I/O firmware images, the I/O BSD determines the configuration and capabilities of the I/O controller that is to be booted. The I/O BSD then searches through the firmware images, such as by searching each header, to determine which I/O firmware image supports the configuration and capabilities of the I/O controller.

The present invention also provides a means to the I/O BSD to locate the multiple different I/O firmware images once they are copied to system memory. In the prior art, providing a method for locating the single firmware image was not necessary because the single I/O firmware image and the I/O BSD were part of the same file. That file was copied as a single package to system memory. Thus, in the prior art, the I/O BSD knew that the I/O firmware image was located with the I/O BSD.

According to the present invention, the I/O BSD and the multiple I/O firmware images are separate files, and may indeed be many separate files. After the I/O BSD is copied to system memory and begins executing, it has no way to know where the I/O firmware images are located. In this case, a method and apparatus is needed in order to provide the location of the multiple I/O firmware images to the I/O BSD. According to the preferred embodiment, when the system BIOS copies the file that includes the multiple I/O firmware images to a particular address in system memory, the system BIOS stores that address in non-volatile storage. This address can then be accessed by the I/O BSD when the I/O BSD needs to locate the I/O firmware images. In a different embodiment, the address can be passed as a parameter from the system BIOS to the I/O BIOS. Those skilled in the art will recognize that although two examples are provided, there are other suitable methods for providing the address of the I/O firmware images to the I/O BSD.

Further, the process of the present invention that is described herein as being performed by the I/O BSD can be implemented using any suitable application, diagnostic, driver, routine, or etc. that has access to the I/O firmware images, and their location in system memory.

FIG. 1 is a block diagram of a computer system that includes multiple I/O controllers that can be booted utilizing an I/O firmware image that was selected from among multiple different available I/O firmware images in accordance with a preferred embodiment of the present invention. Computer system 100 may be a symmetric multiprocessor (SMP) system including a plurality of processors 102 and 104 connected to system bus 106. Alternatively, a single processor system may be employed. Also connected to system bus 106 is system memory 108 and flash memory 109. I/O bus bridge 110 is connected to system bus 106 and provides an interface to I/O bus 112.

System 100 includes one or more I/O controllers. According to the depicted embodiment, each I/O controller is implemented as a PCI Bus Bridge. Those skilled in the art will recognize that other technologies may be used to implement an I/O controller.

The I/O controllers described herein are not capable of automatically loading, also called "bootstrapping", their own firmware. The I/O firmware image for a particular I/O controller must be loaded into that I/O controller by a driver that is not being executed by the I/O controller, such as the BSD driver.

System 100 includes I/O controllers, also referred to herein as PCI bus bridges, 114, 116, 118, and 150. According to the present invention, each I/O controller is a bootable device that requires an I/O firmware image in order to boot, function, and operate. The particular I/O firmware image required by a particular one of these I/O controllers is dependent upon the particular configuration and capabilities of that I/O controller. Further, each one of these I/O controllers may be have different configurations and capabilities from each other and thus require a different firmware image.

Peripheral component interconnect (PCI) bus bridge 114 connected to I/O bus 112 provides an interface to PCI local bus 124. A number of modems may be connected to PCI bus 124. Typical PCI bus implementations will support four PCI expansion slots or add-in connectors. Communications links to other computers may be provided through modem 126 and network adapter 128 connected to PCI local bus 124 through add-in boards. In this manner, data processing system 100 allows connections to multiple external network computers.

PCI bus bridge 116 is connected to PCI local bus 130. A storage device, such as a media disk drive 132, is included in system 100. A storage device, such as a disk drive 132 capable of receiving removable media, is included in system 100. Removable media includes DVD-ROMs, CD-ROMs, floppy disk, tapes, and other media. Media disk drive 132 is coupled to PCI bus 130 via an I/O adapter card 134.

PCI bus bridge 118 is connected to PCI local bus 136. Another storage device, such as a hard disk drive 138, is included in system 100. Hard disk drive 138 is coupled to PCI bus 136 via an I/O adapter card 140. A memory-mapped graphics adapter 142 may also be connected to I/O bus 136 as depicted.

PCI bus bridge 150 is connected to PCI local bus 152. An I/O adapter card 154 is coupled to PCI bus 152.

As described above, the address in system memory of the multiple I/O firmware images may be stored in a non-volatile storage device such as non-volatile storage 156, which is coupled to system bus 106. Non-volatile storage 156 may be implemented as an NVRAM device, for example. The multiple I/O firmware images are preferably stored sequentially within a single file. The starting system memory address of this file is stored in non-volatile storage 156, according to one embodiment.

When the system BIOS copies the I/O firmware images from flash memory 109 to system memory 108, the I/O firmware images are stored in system memory 108 starting at a particular address. The system BIOS will then store this particular address within storage 156.

When the I/O BSD needs to locate the I/O firmware images, the I/O BSD can obtain the particular address where the I/O firmware images are stored by reading the value stored in storage 156.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the preferred embodiment.

Figure 2:
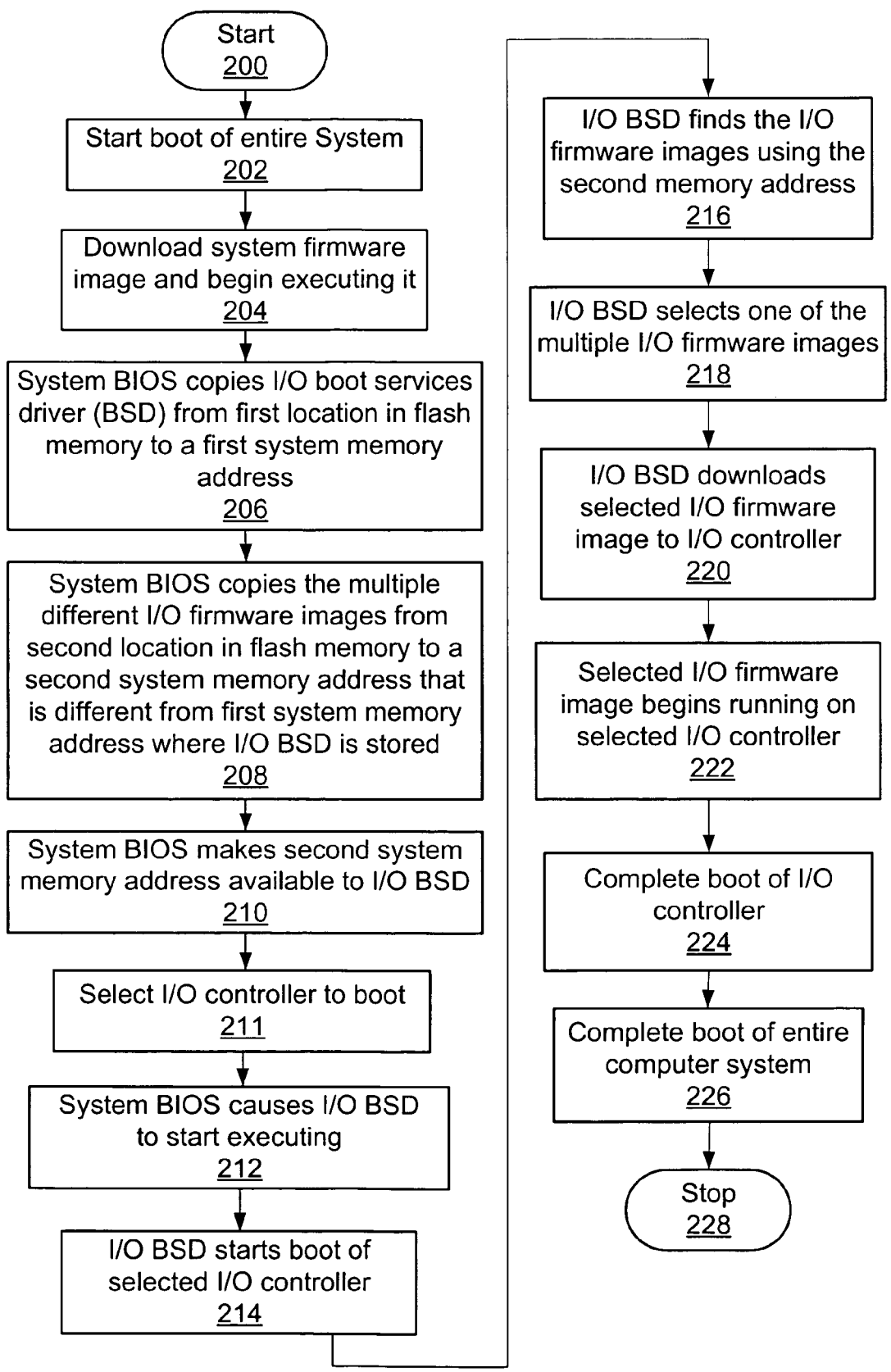
FIG. 2 is a high level flow chart that depicts booting an I/O controller utilizing an I/O firmware image that was selected from among multiple different available I/O firmware images in accordance with a preferred embodiment of the present invention.

FIG. 2 is a high level flow chart that depicts booting an I/O controller utilizing an I/O firmware image that was selected from among multiple different available I/O firmware images in accordance with a preferred embodiment of the present invention. The process starts as depicted by block 200 and thereafter passes to block 202 which illustrates starting the booting of the entire computer system. Next, block 204 illustrates downloading the system firmware image and beginning executing it which includes the execution of the system BIOS.

The process then passes to block 206 which depicts the system BIOS copying the I/O boot services driver (BSD) from a first location in the flash memory to a first system memory address. The process then passes to block 208 which illustrates the system BIOS copying the multiple different firmware images from a second location in flash memory to a second system memory address that is different from the first system memory address where the I/O BSD is stored. Thereafter, block 210 depicts the system BIOS making the second system memory address available to the I/O BSD. Block 211, then, illustrates selecting one of the I/O controllers to boot.

Next, block 212 illustrates the system BIOS causing the I/O BSD to start executing. Block 214, then, depicts the I/O BSD starting the booting of the selected I/O controller. The process then passes to block 216 which illustrates the I/O BSD finding the multiple different firmware images using the second memory address. Thereafter, block 218 depicts the I/O BSD selecting one of the multiple I/O firmware images. One process of selecting a particular I/O firmware image is described in more detail with regard to FIG. 3.

Another process for selecting a particular I/O firmware image is a preselection process where the particular I/O firmware image is preselected for a particular I/O controller. As an example of this process, an identification of each I/O controller would be included within storage 156. When a particular I/O firmware image is preselected for a particular I/O controller, an identification of the preselected I/O firmware image would be included in storage 156 along with the identification of the I/O controller for which it was preselected. In this case, the preselected I/O firmware image would be selected from the multiple images and downloaded only for that particular I/O controller. The process described by FIG. 3 would be used for dynamically selecting one of the I/O firmware image for all other I/O controllers.

The process then passes to block 220 which illustrates the I/O BSD downloading the selected firmware image to the I/O controller. Thereafter, block 222 depicts the selected firmware image beginning to run on the I/O controller. Next, block 224 illustrates completing the booting of the I/O controller. Block 226, then, depicts completing the booting of the entire computer system. The process then terminates as illustrated by block 228.

Figure 3:
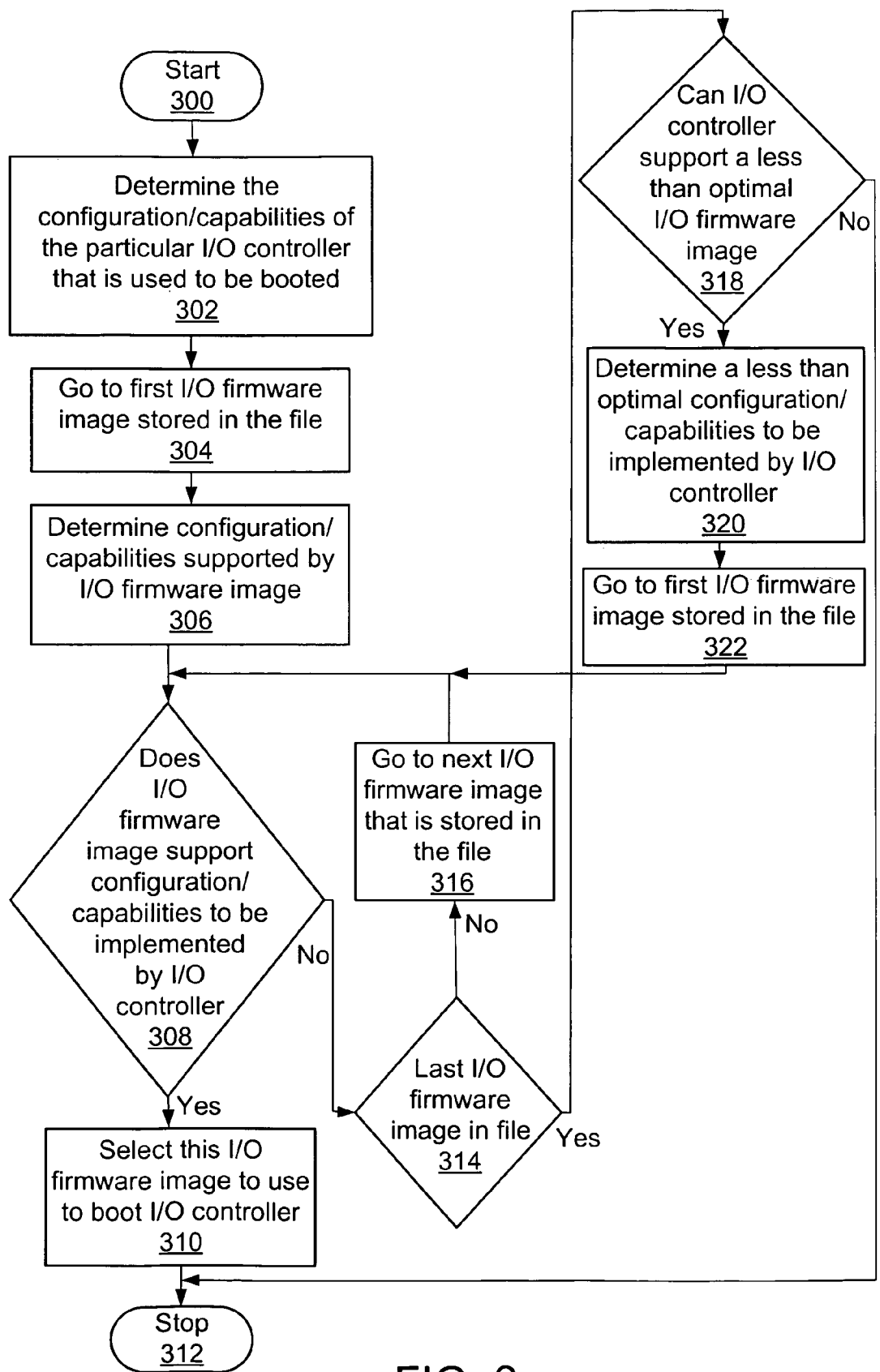
FIG. 3 is a high level flow chart that illustrates selecting an I/O firmware image to use to boot an I/O controller from among multiple different available I/O firmware images in accordance with a preferred embodiment of the present invention.
Figure 4:
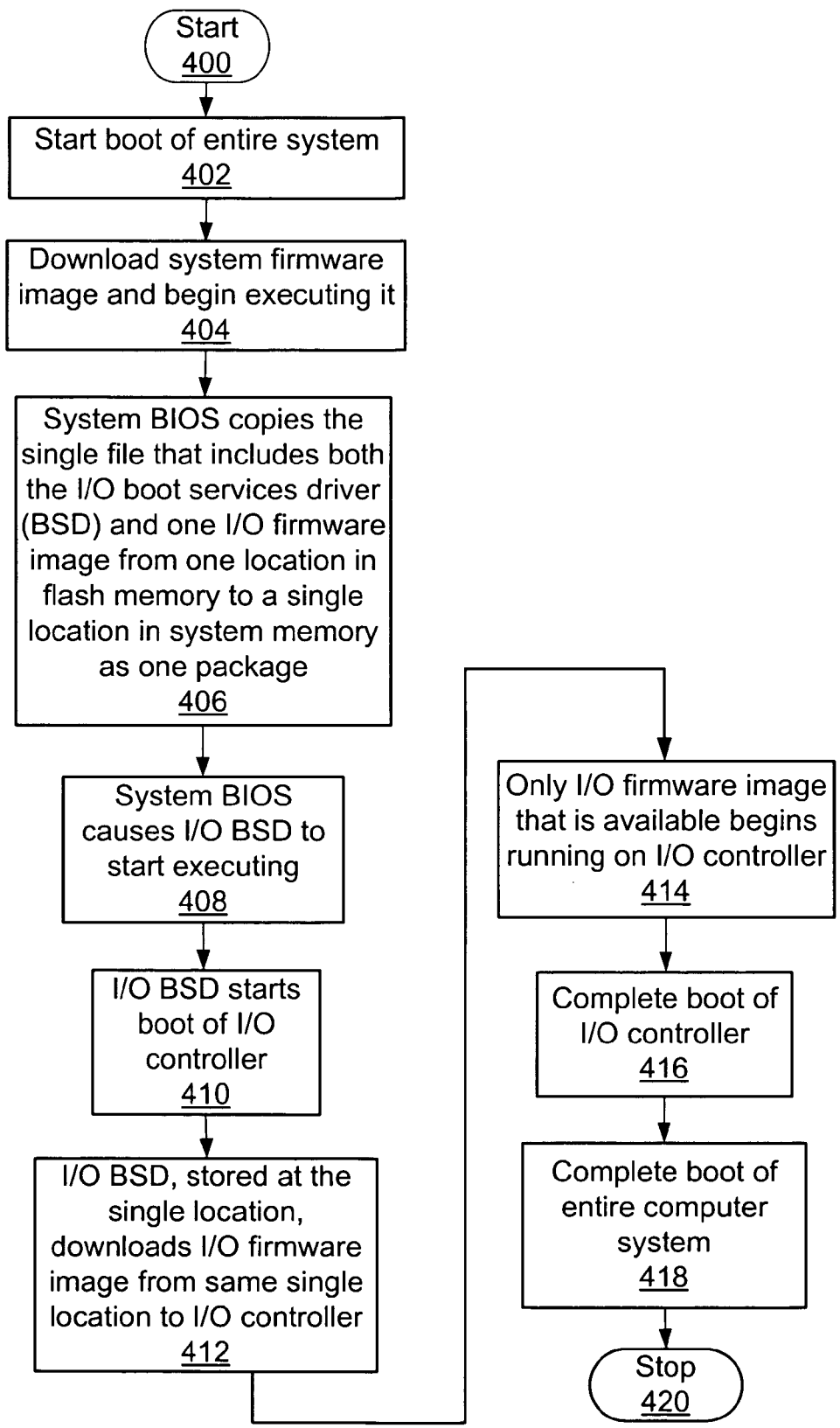
FIG. 4 is a high level flow chart that depicts booting an I/O controller utilizing a single file that includes a boot services driver and a single I/O firmware image that is the only available I/O firmware image to use to boot the controller in accordance with the prior art.

FIG. 3 is a high level flow chart that illustrates selecting an I/O firmware image to use to boot an I/O controller from among multiple different available I/O firmware images in accordance with a preferred embodiment of the present invention. The process starts as depicted by block 300 and thereafter passes to block 302 which illustrates determining the configuration and capabilities of the particular I/O controller that is used in the computer system. Next, block 304 depicts going to the first I/O firmware image that is stored in the file. The process then passes to block 306 which illustrates determining the configuration and capabilities that are supported by this I/O firmware image. As one example, the configuration and capabilities of this I/O firmware image may be determined by reading information from the header that is included within this I/O firmware image.

Block 308, then, depicts a determination of whether or not this I/O firmware image supports the particular configuration and capabilities that are to be implemented by the I/O controller that is to be booted. If a determination is made that the I/O firmware image does support the configuration and capabilities that are to be implemented by the I/O controller that is to be booted, the process passes to block 310 which illustrates selecting this particular I/O firmware image to use to boot the I/O controller. The process then terminates as depicted by block 312.

Referring again to block 308, if a determination is made that the I/O firmware image does not support the configuration and capabilities that are to be implemented by the I/O controller that is to be booted, the process passes to block 314 which illustrates a determination of whether or not this is the last I/O firmware image stored in the file. If a determination is made that this is not the last I/O firmware image stored in the file, the process passes to block 316 which depicts going to the next I/O firmware image that is stored in the file. The process then passes back to block 308.

Referring again to block 314, if a determination is made that this is the last I/O firmware image stored in the file, the process passes to block 318 which depicts a determination of whether or not the I/O controller that is to be booted can support a less than optimal I/O firmware image. A less than optimal I/O firmware image is an I/O firmware image that supports some, but not all, of the configuration and/or capabilities of the I/O controller it will be executed on. If a determination is made that the I/O controller that is to be booted cannot support a less than optimal I/O firmware image, the process terminates as illustrated by block 312.

Referring again to block 318, if a determination is made that the I/O controller that is to booted can support a less than optimal I/O firmware image, the process passes to block 320 which illustrates determining a less than optimal configuration and/or capabilities to be implemented by the I/O controller. Next, block 322 depicts going to the first I/O firmware image that is stored in the file. The process then passes back to block 308.

The present invention provides many advantages over the prior art. In a system that includes multiple I/O controllers that are configured differently and have different capabilities, the firmware image that best supports the full configuration and capabilities of each I/O controller can be dynamically selected, downloaded to, and used to boot each I/O controller.

In addition, the multiple I/O firmware images are stored separately from and can be accessed independently from the I/O boot services driver (BSD). Because the I/O BSD and firmware images are stored and accessible separately and independently, one can be updated or modified without accessing the other. This reduces the opportunity for making inadvertent modifications in either the BSD or firmware images. For example, if one of the I/O firmware images needs to be updated, the BSD does not need to be accessed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamically selecting one of multiple different input/output (I/O) firmware images to boot an I/O controller, the method comprising:
storing a plurality of different I/O firmware images sequentially in a single file;
determining a configuration of the I/O controller;
determining a configuration that is supported by a first one of the plurality of different I/O firmware images in the single file to use to boot the I/O controller;
in response to determining that the first one of the plurality of different I/O firmware images in the single file does support the configuration of the I/O controller, selecting the first one of the plurality of different I/O firmware images in the file;
in response to determining that the first one of said plurality of different I/O firmware images in the file does not support the configuration of the I/O controller, determining a configuration that is supported by a second one of the plurality of different I/O firmware images in the file;
in response to determining that the second one of said plurality of different I/O firmware images in the file does support the configuration of the I/O controller, selecting the second one of the plurality of different I/O firmware images in the file;
storing a boot services driver, that is required in order for said I/O controller to be booted, in a first flash memory location;
storing the plurality of different I/O firmware images in a second flash memory location;
beginning a boot of the data processing system;
copying, by a system BIOS, the boot services driver from the first flash memory location to a first system memory location; and
copying, by the system BIOS, the plurality of different I/O firmware images from the second flash memory location to a second system memory location, wherein the plurality of different I/O firmware images and the boot services driver are stored separately in the system memory.

2. The method according to claim 1, further comprising:
booting, by a boot services driver, the I/O controller utilizing the one of said plurality of I/O firmware images.

3. The method according to claim 1, further comprising:
downloading, by a boot services driver, the one of the plurality of I/O firmware images to the I/O controller, the I/O controller requiring the boot services driver in order to be booted.

4. The method according to claim 1, further comprising:
storing a boot services driver, that is required in order for the I/O controller to be booted, in a first memory location; and
storing said plurality of different I/O firmware images in a second memory location, wherein the plurality of different I/O firmware images and said boot services driver are stored separately in the memory and are not bundled together.

5. The method according to claim 1, further comprising:
providing, by the system BIOS, the second system memory location to the boot services driver.

6. The method according to claim 5, further comprising:
starting executing, by the system BIOS, the boot services driver;
retrieving, by the boot services driver, the second system memory location; and
locating, by the boot services driver, the plurality of different I/O firmware images utilizing the second system memory location.

7. The method according to claim 6, further comprising:
selecting, by the boot services driver, one of the plurality of different I/O firmware images from the second system memory location.

8. The method according to claim 1, further comprising:
storing the second system memory location in a non-volatile storage location.

9. The method according to claim 1, further comprising:
in response to being unable to identify one of the plurality of I/O firmware images that supports the configuration, determining whether the I/O controller supports a different configuration; and
in response to determining that said I/O controller supports a different configuration, selecting one of the plurality of different I/O firmware images that supports the different configuration to use to boot the I/O controller.

10. An apparatus in a data processing system for dynamically selecting one of multiple different input/output (I/O) firmware images, the apparatus comprising:
a plurality of different I/O firmware images;
an I/O controller having a configuration;

a computer processing unit (CPU) in the data processing system executing code to identify one of a plurality of I/O firmware images;

the CPU executing code for determining that none of the plurality of I/O firmware images supports the I/O controller configuration, the CPU executing code for determining whether the I/O controller supports a different configuration;

responsive to determining that the I/O controller supports a different configuration, the CPU executing code for selecting one of the plurality of different I/O firmware images that supports the different configuration to boot the I/O controller;

a first flash memory location for storing a boot services driver, the boot services driver being required in order for the I/O controller to be booted;

a second flash memory location for storing the plurality of different I/O firmware images;

a system BIOS copying the boot services driver from the first flash memory location to a first system memory location; and the system BIOS copying the plurality of different I/O firmware images from the second flash memory location to a second system memory location, wherein the plurality of different I/O firmware images and the boot services driver are stored separately in the system memory.

11. The apparatus according to claim 10, further comprising:

a boot services driver booting the I/O controller utilizing the one of the plurality of I/O firmware images.

12. The apparatus according to claim 10, further comprising:

a boot services driver downloading the one of the plurality of I/O firmware images to the I/O controller, the I/O controller requiring the boot services driver in order to be booted.

13. The apparatus according to claim 10, further comprising:

a first memory location for storing a boot services driver, that is required in order for the I/O controller to be booted, stored in a first memory location; and a second memory location for storing the plurality of different I/O firmware images, wherein the plurality of different I/O firmware images and the boot services driver are stored separately in the memory and are not bundled together.

14. The apparatus according to claim 10, further comprising:

the system BIOS providing the second system memory location to the boot services driver.

15. The apparatus according to claim 14, further comprising:

the system BIOS causing the boot services driver to start executing;

the boot services driver retrieving the second system memory location; and the boot services driver locating the plurality of different I/O firmware images utilizing the second system memory location.

16. The apparatus according to claim 10, further comprising:

a non-volatile storage location for storing the second system memory location.

* * * * *